(12) United States Patent
Nagashima et al.

(10) Patent No.: US 6,564,990 B2
(45) Date of Patent: May 20, 2003

(54) METHOD OF WELDING HIGH CHROMIUM AUSTENITIC STAINLESS STEEL PIPE AND SHIELDING GAS MIXTURE FOR WELDING

(75) Inventors: Eiki Nagashima, Chiba (JP); Toshitsugu Fukai, Ichihara (JP)

(73) Assignee: Toyo Engineering Corporation, Tokyo (JP)

(*) Notice: Subject to any disclaimer, the term of this patent is extended or adjusted under 35 U.S.C. 154(b) by 63 days.

(21) Appl. No.: 09/847,394

(22) Filed: May 3, 2001

(65) Prior Publication Data
US 2002/0014473 A1 Feb. 7, 2002

(30) Foreign Application Priority Data
May 12, 2000 (JP) ........................ 2000-140501

(51) Int. Cl.⁷ .................... B23K 31/02; B23K 35/38
(52) U.S. Cl. .................... 228/219; 228/218; 219/72; 219/74
(58) Field of Search .................... 219/72, 74; 228/219, 228/218

(56) References Cited

U.S. PATENT DOCUMENTS

| | | | | |
|---|---|---|---|---|
| 3,470,346 A | * | 9/1969 | Duboz et al. | ................. 219/74 |
| 4,463,243 A | * | 7/1984 | Church | ........................ 219/74 |
| 4,973,822 A | * | 11/1990 | Evans et al. | ........... 219/137 PS |
| 5,396,039 A | * | 3/1995 | Chevrel et al. | ............... 219/61 |
| 5,686,002 A | * | 11/1997 | Flood et al. | ............ 219/137 R |

FOREIGN PATENT DOCUMENTS

| | | | |
|---|---|---|---|
| FR | 2375945 | * | 7/1978 |
| JP | B-58-46391 | * | 10/1983 |
| JP | 60-261679 | | 12/1985 |
| JP | A-06-170532 | | 6/1994 |
| JP | 08-033982 | | 2/1996 |

OTHER PUBLICATIONS

Woldman's Engineering Alloys, 8th edition, John P. Frick editor p. 1347.*

* cited by examiner

Primary Examiner—M. Alexandra Elve
(74) Attorney, Agent, or Firm—Oblon, Spivak, McClelland, Maier & Neustadt, P.C.

(57) ABSTRACT

Stainless steels are welded using a shielding gas including 88 to 98.9 mole % Ar, 1 to 10 mole % $H_2$, and 0.1 to 2.0 mole % $CO_2$. The shielding gas permits low sulfur, high chromium, austenitic stainless steel pipes to be joined with welds having sufficient penetration, strength, corrosion resistance and durability for practical use.

20 Claims, 1 Drawing Sheet

METHOD OF WELDING HIGH CHROMIUM AUSTENITIC STAINLESS STEEL PIPE AND SHIELDING GAS MIXTURE FOR WELDING

BACKGROUND OF THE INVENTION

1. Field of the Invention

This invention relates to welding stainless steel. More particularly, this invention relates to welding high chromium austenitic stainless steel pipe using a shielding gas.

2. Discussion of the Background

Bore welding techniques used to weld low sulfur, high chromium austenitic stainless steel pipes together, or to weld a pipe to a pipe plate, typically use 100 mole % of argon gas as a shielding gas. However, when the high chromium austenitic stainless steel pipe is 25 Cr-22 Ni-2 Mo stainless steel (ASME standardized material UNS S31050), 24 Cr-14 Ni-1 Mo stainless steel (JIS standardized material SUS 317J2) or the like, many problems arise. For example, in joining these steel pipes the welding often provides insufficient weld strength and corrosion resistance for practical use. This is because the content of sulfur, which is typically used to improve weld penetration, is only about 0.001% by weight in these steels, and pipes formed from these steels are often rather thick.

SUMMARY OF THE INVENTION

The present invention provides a method of welding stainless steel in which a shielding gas mixture including 88 to 98.9 mole % Ar, 1 to 10 mole % $H_2$ and 0.1 to 2.0 mole % $CO_2$ is used to shield and protect the stainless steel from contamination and oxidizing gases. The method is particularly suited to welding high chromium austenitic stainless steels. Even when welding thick pipes of stainless steels having low sulfur contents (e.g., 0.005% by weight or less), excellent weld penetration is achieved. Welds produced according to the present invention have enough strength, corrosion resistance and durability even under very sever conditions.

DETAILED DESCRIPTION OF THE INVENTION

Figure 1:
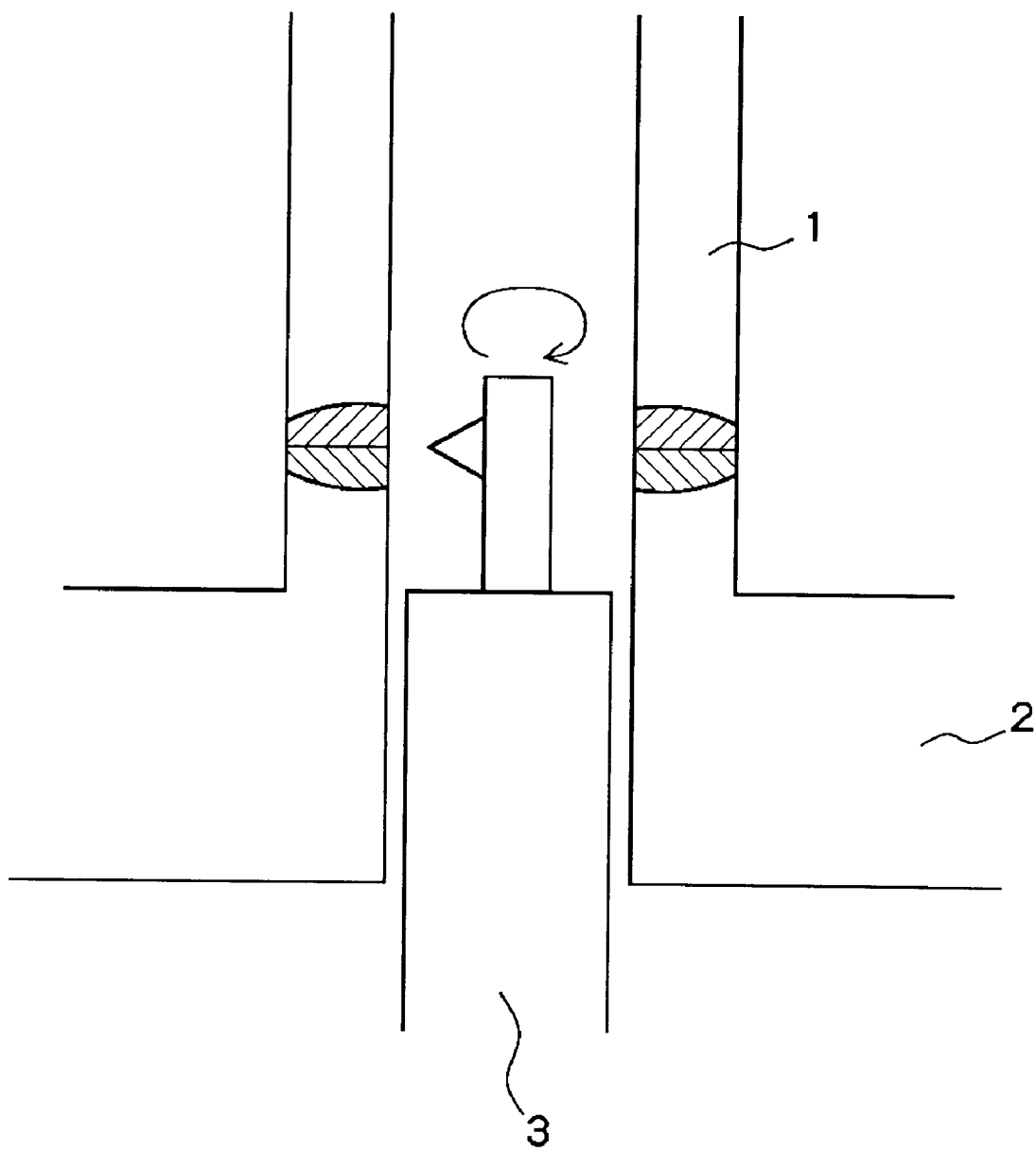
FIG. 1 illustrates automatic bore welding of a pipe to a pipe plate.

The present invention provides a method of welding stainless steel using a shielding gas mixture.

In embodiments, the stainless steel can be a high chromium austenitic stainless steel. The high chromium austenitic stainless steel can contain not less than 20% by weight, preferably 20 to 30% by weight, of chromium. The stainless steel can be 25 Cr-22 Ni-2 Mo stainless steel or 24 Cr-14 Ni-1 Mo stainless steel.

The sulfur content in the stainless steel can be 0.05% by weight or less, preferably 0.005% by weight or less, more preferably 0.0001 to 0.005% by weight. While conventional welding often uses sulfur to improve weld penetration, according to the present invention excellent welding is possible in a high chromium austenitic stainless steel pipe even in the absence of large amounts of sulfur.

The welding method of the present invention can be used to weld pipes together, or to weld a pipe to a pipe plate. Excellent welds can be formed to pipe having a pipe wall 1 to 10 mm thick, preferably 2 to 4 mm thick. Conventionally, it has been particularly difficult to weld a pipe having a thickness of 2 to 4 mm by bore welding using argon gas. However the present invention provides a welding method capable of carrying out welding with sufficiently high strength even if a pipe has a thickness of 2 to 4 mm.

The shielding gas mixture includes 88 to 98.9 mole %, preferably 91.0 to 96.8 mole %, of argon gas; 1 to 10 mole %, preferably 3.0 to 8.0 mole %, more preferably 4.0 to 6.0 mole %, of hydrogen gas; and 0.1 to 2.0 mole %, preferably 0.2 to 1.0 mole %, more preferably 0.3 to 0.8 mole %, of carbon dioxide gas. The shielding gas mixture of the present invention results in a welded position with excellent weld penetration and sufficient strength.

The shielding gas mixture may be stored prior to use in, e.g., a gas cylinder. Alternatively, argon, hydrogen and carbon dioxide can be mixed at the time of welding in a predetermined mixing ratio to form the shielding gas mixture near the stainless steel being welded.

The method of the present invention is especially effective in the case of bore welding, and in particular automatic bore welding. Excellent welds can be formed by automatic bore welding involving one or two turns of the welding torch.

The bore welding described in the present description means the same welding, for example, as disclosed in the explanation of FIG. 4, described in second column, lines 2 to 8, of Japanese Patent No. 2797444 Publication and means the same meaning of the bore welding described in details in "Asia Nitrogen '98 International Conference & Exhibition (Kuala Lumpur: Feb. 22 to 24, 1998)."

The automatic bore welding includes any welding in which the above bore welding is automated. With reference to FIG. 1, the outline of one embodiment of automatic bore welding will be described while exemplifying a case of welding of a pipe 1 made of high chromium austenitic stainless steel and a pipe plate 2. The pipe 1 and the pipe plate 2 are butted against each other and a welding torch 3 is set in the inside of them. The welding torch is automatically rotated and carries out welding in the entire circumference of the welding position under an atmosphere of the shielding gas mixture of the invention.

EXAMPLES

The invention having been generally described, reference is now made to the following examples, which are provided herein for purposes of illustration only and are not intended to be limiting unless otherwise specified.

Example 1

Using a mixed gas having a composition of 94.5 mole % argon gas, 5.0 mole % hydrogen gas, and 0.5 mole % carbon dioxide gas as a shielding gas, two-turn-automatic bore welding was carried out on pipes with the outer diameter of 25.4 mm and the thickness 2.8 mm (the ratio of the inner diameter/the thickness of the tube: 7.07) made of a high chromium austenitic stainless steel of the 25 Cr-22 Ni-2 Mo stainless steel type containing at highest 0.005% by weight of sulfur. The obtained welded position was found highly durable to practical use in terms of the weld penetration, strength and corrosion resistance. The results are shown in Table 1.

The weld penetration was observed by a radiograph test and by cross-section macro observation, the strength was observed by a mechanical test (tensile test JIS Z 2241) and the corrosion resistance was observed by a Huey test (ASTM A 262 Practice C).

Example 2

Using a mixed gas having a composition of 94.5 mole % argon gas, 5.0 mole % hydrogen gas, and 0.5 mole % carbon dioxide gas as a shielding gas, two-turn-automatic bore welding was carried out on pipes with the outer diameter of 25.4 mm and the thickness 3.4 mm (the ratio of the inner diameter/the thickness of the tube: 5.47) made of a high chromium austenitic stainless steel of the 24 Cr-14 Ni-1 Mo stainless steel type containing at highest 0.005% by weight of sulfur. The obtained welded position was found highly durable to practical use in terms of the weld penetration, strength and corrosion resistance. The results are shown in Table 1.

Example 3

Using a mixed gas having a composition of 94.4 mole % argon gas, 5.0 mole % hydrogen gas, and 0.6 mole % carbon dioxide gas as a shielding gas, one-turn-automatic bore welding was carried out on pipes with the outer diameter of 25.4 mm and the thickness 3.9 mm (the ratio of the inner diameter/the thickness of the tube: 4.51) made of a high chromium austenitic stainless steel of the 25 Cr-22 Ni-2 Mo stainless steel type containing at highest 0.005% by weight of sulfur. The obtained welded position was found highly durable to practical use in terms of the weld penetration, strength and corrosion resistance. The results are shown in Table 1.

Comparative Example 1

Using 100 mole % argon gas as a shielding gas, two-turn-automatic bore welding was carried out for pipes with the outer diameter of 25.4 mm and the thickness 3.4 mm (the ratio of the inner diameter/the thickness of the tube: 5.47) made of a high chromium austenitic stainless steel of the 25 Cr-22 Ni-2 Mo stainless steel type containing at highest 0.005% by weight of sulfur. The obtained welded position was consequently found being not provided with sufficient weld penetration and not durable in terms of the strength to be used for practical use. The results are shown in Table 1.

Comparative Example 2

Using 100 mole % argon gas as a shielding gas, two-turn-automatic bore welding was carried out for pipes with the outer diameter of 25.4 mm and the thickness 3.4 mm (the ratio of the inner diameter/the thickness of the tube: 5.47) made of a high chromium austenitic stainless steel of the 24 Cr-14 Ni-1 Mo stainless steel type containing at highest 0.005% by weight of sulfur. The obtained welded position was consequently found being not provided with sufficient weld penetration and not durable in terms of the strength to be used for practical use. The results are shown in Table 1.

Comparative Example 3

Using argon gas containing 2.0 mole % hydrogen as a shielding gas, two-turn-automatic bore welding was carried out for pipes with the outer diameter of 25.4 mm and the thickness 3.4 mm (the ratio of the inner diameter/the thickness of the tube: 5.47) made of a high chromium austenitic stainless steel of the 25 Cr-22 Ni-2 Mo stainless steel type containing at highest 0.005% by weight of sulfur. The obtained welded position was consequently found being not provided with sufficient weld penetration and not durable in terms of the strength to be used for practical use. The results are shown in Table 1.

Comparative Example 4

Using argon gas containing 15 mole % hydrogen and 2.5 mole % carbon dioxide gas as a shielding gas, two-turn-automatic bore welding was carried out for pipes with the outer diameter of 25.4 mm and the thickness 3.4 mm (the ratio of the inner diameter/the thickness of the tube: 5.47) made of a high chromium austenitic stainless steel of the 25 Cr-22 Ni-2 Mo stainless steel type containing at highest 0.005% by weight of sulfur. The obtained welded position was consequently found having faults therein and being not durable in terms of the strength and the corrosion resistance to be used for practical use, although sufficient weld penetration was achieved. The results are shown in Table 1.

TABLE 1

|  | Example 1 | Example 2 | Example 3 | Comparative example 1 | Comparative example 2 | Comparative example 3 | Comparative example 4 |
| --- | --- | --- | --- | --- | --- | --- | --- |
| Sulfur concentration (weight %) | not more than 0.005 | not more than 0.005 | not more than 0.005 | not more than 0.005 | not more than 0.005 | not more than 0.005 | not more than 0.005 |
| Gas composition (mole %) | | | | | | | |
| Ar | 94.5 | 94.5 | 94.4 | 100 | 100 | 98.0 | 82.5 |
| $H_2$ | 5.0 | 5.0 | 5.0 | | | 2.0 | 15.0 |
| $CO_2$ | 0.5 | 0.5 | 0.6 | | | | 2.5 |
| Material | | | | | | | |
| 25Cr—22Ni—2Mo | T | — | T | T | — | T | T |
| 24Cr—14Ni—1Mo | — | T | — | — | T | — | — |
| Pipe thickness (mm) | 2.8 | 3.4 | 3.9 | 3.4 | 3.4 | 3.4 | 3.4 |
| Outer diameter (mm) | 25.4 | 25.4 | 25.4 | 25.4 | 25.4 | 25.4 | 25.4 |
| Inner diameter/The thickness of pipe (ratio) | 7.07 | 5.47 | 4.51 | 5.47 | 5.47 | 5.47 | 5.47 |
| Welding repetitions | 2 | 2 | 1 | 2 | 2 | 2 | 2 |
| Weld penetration | good | good | good | insufficient | insufficient | insufficient | good |
| Strength | good | good | good | insufficient | insufficient | insufficient | insufficient |
| Corrosion resistance | good | good | good | insufficient | insufficient | insufficient | insufficient |

In an circumference automatic bore welding of a high chromium austenitic stainless steel containing sulfur in a low content, problems in the welding, the strength and the corrosion resistance which have not conventionally been solved can be solved by using a shielding gas mixture of the present invention. The bore welding of the present invention, for welding pipes to each other and for welding a pipe directly to a pipe plate, using the shielding gas mixture can provide a welded position sufficient in the weld penetration and durable in practical use in terms of strength and corrosion resistance.

As described in detail above, the present invention provides a welding method capable of carrying out excellent welding even for a high chromium austenitic stainless steel pipe containing sulfur in low content and having a high thickness, which has conventionally been difficult to be welded. The present invention also provides a shielding gas mixture to be used for the welding method.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A welding method comprising welding a stainless steel using a shielding gas mixture including 88 to 98.9 mole % Ar, 1 to 10 mole % $H_2$, and 0.1 to 1.0 mole % $CO_2$.

2. The method according to claim 1, wherein the stainless steel is an austenitic stainless steel.

3. The method according to claim 1, wherein the stainless steel comprises 20 to 30% by weight chromium.

4. The method according to claim 1, wherein the stainless steel comprises at most 0.05% by weight sulfur.

5. The method according to claim 1, wherein the stainless steel is selected from the group consisting of 25Cr-22Ni-2Mo stainless steel and 24Cr-14Ni-1Mo stainless steel.

6. The method according to claim 1, wherein the stainless steel has a form selected from the group consisting of a pipe and a pipe plate.

7. The method according to claim 1, wherein the stainless steel is from 1 to 10 mm thick.

8. The method according to claim 1, wherein the welding comprises bore welding.

9. The method according to claim 1, wherein the welding comprises automatic bore welding.

10. The method according to claim 1, wherein the welding comprises a step for shielding the stainless steel from oxidizing gases and contamination.

11. A welding method comprising welding a stainless steel using a shielding gas mixture consisting of 88 to 98.9 mole % Ar, 1 to 10 mole % $H_2$, and 0.1 to 2.0 mole % $CO_2$.

12. The method according to claim 11, wherein the stainless steel is an austenitic stainless steel.

13. The method according to claim 11, wherein the stainless steel comprises 20 to 30% by weight chromium.

14. The method according to claim 11, wherein the stainless steel comprises at most 0.05% by weight sulfur.

15. The method according to claim 11, wherein the stainless steel is selected from the group consisting of 25Cr-22Ni-2Mo stainless steel and 24Cr-14Ni-1Mo stainless steel.

16. The method according to claim 11, wherein the stainless steel has a form selected from the group consisting of a pipe and a pipe plate.

17. The method according to claim 11, wherein the stainless steel is from 1 to 10 mm thick.

18. The method according to claim 11, wherein the welding comprises bore welding.

19. The method according to claim 11, wherein the welding comprises automatic bore welding.

20. The method according to claim 11, wherein the welding comprises a step for shielding the stainless steel from oxidizing gases and contamination.

* * * * *